United States Patent [19]

Knox

[11] 4,346,052

[45] Aug. 24, 1982

[54] PROCESS FOR HOMOGENEOUS CURLY SYNTHETIC POLYMER FIBERS

[75] Inventor: Jack R. Knox, Naperville, Ill.

[73] Assignee: Standard Oil Company (Indiana), Chicago, Ill.

[21] Appl. No.: 174,200

[22] Filed: Jul. 31, 1980

Related U.S. Application Data

[62] Division of Ser. No. 909,161, May 24, 1978, Pat. No. 4,241,002, which is a division of Ser. No. 712,845, Aug. 9, 1976, abandoned.

[51] Int. Cl.$^3$ .............................................. B28B 3/20
[52] U.S. Cl. ................................ 264/176 F; 264/211; 524/583; 524/373
[58] Field of Search ............... 260/45.95 G; 264/211, 264/176 R, 176 Z

[56] References Cited

U.S. PATENT DOCUMENTS

| 3,511,824 | 5/1970 | Listner | 525/340 |
| 3,515,687 | 6/1970 | Listner | 525/340 |
| 3,658,634 | 4/1972 | Yanagi et al. | 260/45.95 G |
| 3,666,692 | 5/1972 | Paige et al. | 260/45.95 G |
| 3,787,506 | 1/1974 | Ungetug et al. | 260/45.95 G |
| 3,883,481 | 5/1975 | Kopetz et al. | 260/45.95 G |

OTHER PUBLICATIONS

"Stereochemical Configuration of PP by Hydrogen NMR" by Stebling et al. Macromolecules, 8 pp. 595-604, 3-1975.

Primary Examiner—Jay H. Woo
Attorney, Agent, or Firm—David E. Boone; William T. McClain; William H. Magidson

[57] ABSTRACT

Process and composition relating to novel, fine denier, homogeneous, curly synthetic fibers are set out. The process comprises orientation of a fiber-forming, slowly crystallizing, synthetic polymer composition in fiber form, generally after melt spinning, such orientation resulting from application of a longitudinal tensile force to said fiber above the crystallization temperature range and maintaining it at least through such range during a controlled, substantially axially symmetric cooling of the fiber. The novel fibers have a substantially axially symmetric, residual tensile force differential between their outer sheaths and inner portions, are generally of helical configuration and can exhibit more than about fifteen turns per linear centimeter.

2 Claims, 5 Drawing Figures

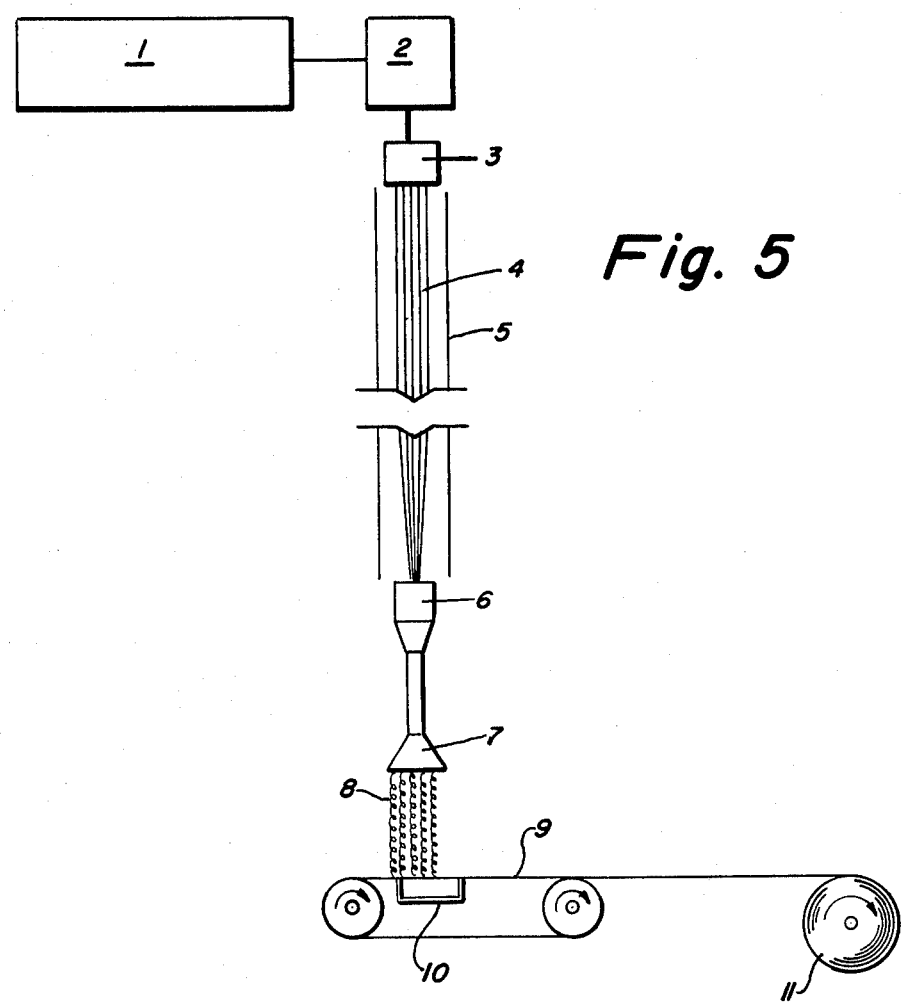

PROCESS FOR HOMOGENEOUS CURLY SYNTHETIC POLYMER FIBERS

This is a division of application Ser. No. 909,161, filed May 24, 1978, U.S. Pat. No. 4,241,002, which is a division of application Ser. No. 712,845 filed Aug. 9, 1976, now abandoned.

SUMMARY OF THE INVENTION

This invention relates to novel, fine denier, homogenous, curly fibers made from a slowly crystallizing, fiber-forming, synethetic polymer composition and a process for manufacture of such fibers involving a controlled, substantially axially symmetric cooling through the crystallization temperature range of said composition in fiber form and, more specifically, to homogeneous, fine denier fibers made from a slowly crystallizing, fiber-forming, synthetic polymer composition having a curly configuration which exhibit good bulkiness and feel and which are produced in a process involving orienting the fiber by applying a longitudinal tensile force, generally after melt spinning, above about the crystallization temperature range of the polymer, and maintaining such tensile force while the fiber is cooled substantially axially symmetrically in a controlled cooling zone at least through such crystallization range, which process results in a generally helical fiber having a substantially axially symmetric, residual tensile force differential between its outer sheath and inner portion.

In accordance with the instant invention, homogeneous, fine denier fiber prepared from a slowly crystallizing, fiber-forming, synthetic polymer composition is given a curly, generally helical configuration having more than about two turns per linear centimeter by applying a longitudinal tensile force to the molten fiber at a temperature above about the crystallization temperature range of the composition and maintaining such force at least through such crystallization range during a controlled, substantially axially symmetric cooling process producing a substantially axially symmetric, residual tensile force differential between the outer sheath and interior portion of the fiber.

BACKGROUND OF THE INVENTION

Synthetic fibers have had a generally increasing usefulness in this century replacing natural fibers such as wool and cotton because of the plurality of special properties which can be incorporated into man-made fibers. However, synthetic fibers lack an important feature of natural fibers which is a natural curl or crimp that gives masses of a natural fiber bulkiness and feel or, as termed in the fiber industry, hand. Previous solutions to the problem of providing such a curl or crimp in synthetic fibers involves inter alia: (a) producing a conjugate fiber obtained by melt spinning polymers of different properties through a specifically shaped die face, (b) asymmetric quenching of fibers immediately after extrusion to provide a difference in microstructure in the transverse direction of the fibers, and (c) mechanically crimping the fibers, for example, in a stuffing box process.

In the asymmetric quenched fibers, the difference in microstructure in the transverse direction of the fibers is provided by the difference in the rate of cooling of opposite sides of the polymer immediately after extrusion. Furthermore, if in an attempt to render the structural difference larger, a greater amount of cooling air is used, the spinning conditions become worsened, and breakage of filaments occurs, at which point the operation becomes impossible.

With respect to mechanical crimping, the fibers produced in that way generally do not have satisfactory stability and uniformity of the crimps, and fine crimps cannot be obtained.

Now a novel process has been found which can simply and economically provide a commercially usable, homogeneous, fine denier, synthetic fiber having a substantial number of curls per unit length, which fiber is generally helical in configuration. The process can be applied to homopolymers or copolymers and is adaptable to the common commercial devices for melt spinning of fibers. Such process is a substantial improvement over present methods of imparting curl to synthetic fibers and produces a novel synthetic fiber having an axially symmetric, residual tensile force differential between its outer sheath and interior portion.

BRIEF DESCRIPTION OF THE DRAWING

FIG. 5 shows one embodiment of a process useful to produce the curly fibers described herein.

STATEMENT OF THE INVENTION

Figure 1:
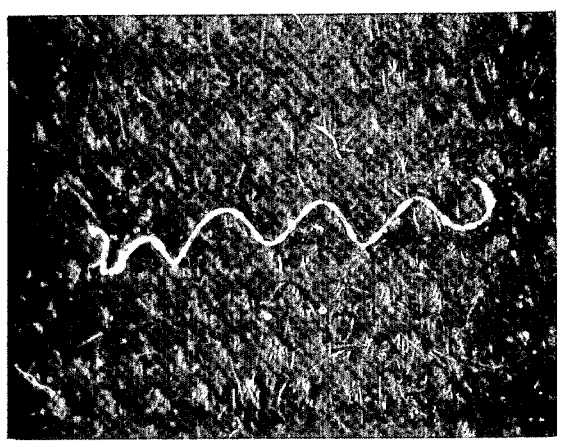
FIG. 1 shows a light photomicrograph of a typical curly fiber having about thirteen turns per linear centimeter produced by a process described herein. Magnification is 22X.

The polymers preferably used in the process described herein to produce the novel, curly fibers are slowly crystallizing, fiber-forming polymeric compositions which contain either a homopolymer, a copolymer, or a combination thereof. Such compositions embrace without limitation addition polymers and condensation polymers. By slowly crystallizing is meant polymeric compositions preferably having a crystallization temperature range not less than about 10° C. and, more preferably, not less than about 20° C. and, most preferably, not less than about 25° C., all ranges measured at a cooling rate of about 10° C. per minute using differential thermal analysis. Such a crystallization temperature range will insure that a longitudinal tensile force during the controlled cooling can be applied over a sufficient temperature range so that substantial differential orientation can take place to provide the residual tensile force differential for the particular denier involved giving rise to the curls. However, if the crystallization temperature range is too large, the distance between spinneret and drawing apparatus can be too large for convenience and economy. In such case small amounts of nucleating agent such as succinic acid or the like can be added to reduce the crystallization temperature range. Such agents and their amounts vary with the chemical nature of the polymeric composition being drawn as can be understood by those skilled in the art.

If a stereospecific polymer such as polypropylene has too narrow a crystallization range, such range can be broadened by treating the polymer in a process designed to reduce stereospecificity and hence broaden the crystallization range. For example, an excellent polypropylene for use herein can be made by treating polypropylene having a crystallization temperature range of about 10° C. to about 15° C., when measured at a cooling rate of about 10° C. per minute, with an organic compound having at least one bromine atom labile at a temperature, preferably between about 200° C. and about 325° C., more preferably, labile between about 230° C. and about 275° C., in an extruder to broaden the crystallization range of the polypropylene. More preferably, the bromine compound is a solid organic compound having at least one bromine atom labile in the above temperature ranges and, most preferably, the compound is:

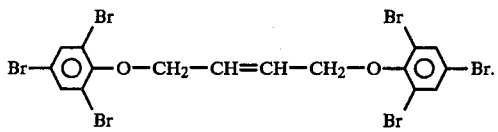

Extruders perferred for increasing the crystallization temperature range are those generally useful in the polymer art.

When the process is carried out between about 200° C. and about 325° C., more preferably, between about 230° C. and about 275° C., random, single inversions in the polymer chain tacticity (isolate l's in a predominantly d chain or isolated d's in a predominantly l chain). These isolated d or l inversions are single inversions and different than the double l or d inversions described by Listner in U.S. Pat. Nos. 3,511,824 and 3,515,687.

Preferably, the compound having a labile bromine atom is in the range about 0.005 to about 0.5 weight percent of the total extruder charge, more preferably, about 0.05 to about 0.25 weight percent and, most preferably, about 0.1 to about 0.2 weight percent of the total charge. Such weight percentages are based on the amount of labile bromine present in the compound.

Preferred polymers are a polyolefin, a polyester or a polyamide, more preferably, a polypropylene, a poly(ethylene terephthalate) or a nylon and, most preferably, a polypropylene.

The present invention also embraces homogeneous, slowly crystallizing, fiber-forming copolymeric compositions in which one of the monomers of above-mentioned polymers is the dominant component. These can be, without limitation, pure block, terminal block, multisegment and crystalline, random type copolymers.

By homogeneous is meant that the fiber is not a conjugate fiber but uniform in chemical composition throughout the fiber cross-section.

The process of the instant invention is preferably applied to one or more filaments exiting from a spinneret or like device during melt spinning or a similar operation. Preferably the melt temperature is below about 320° C., more perferably, below about 300° C., most perferably, below about 280° C. Too high a melt temperature can decompose the polymer being spun and/or interfere with production of the proper residual tensile force differential for the particular denier fiber being produced.

The crystallization temperature and the melt temperature control the distance from the die face at which crystallization and drawing begin. In this respect, for homopolymers the use of a melt temperature sufficiently low and shear conditions sufficiently mild are generally required so that sufficient high molecular weight material is left to maintain at least in part a slow rate of crystallization.

Single fibers having a curl or a multi-strand mass or web in which the individual fibers have a curl can be produced equally well by the processes of the instant invention. In an embodiment in which curl is imparted to the fibers just after spinning, the longitudinal tensile force is preferably applied by exerting a drawing effect on the fiber exiting from the die face.

The use of a draft shield surrounding the fiber during drawing to minimize any axial temperature gradient is especially recommended to provide a uniform cooling zone in which cooling of the fiber can be controlled at least through the crystallization temperature range. This zone should be sufficiently long to allow both crystallization and partial drawing of the fiber and the zone can be either heated or unheated.

The use of a drawing or takeup apparatus at the end of the cooling zone preferably removes fiber at a rate at least about one hundred times its linear velocity as it leaves the face of the die, more preferably, at least about five hundred times such linear velocity and, most preferably, at least about one thousand times the linear velocity of the fiber leaving the due face. For a given polymeric composition, extrusion rate, extrusion temperature, cooling zone length and cooling zone temperature, the number of turns per linear centimeter are increased by increasing the drawing rate.

The fiber produced by the instant method can be utilized to form mats or webs of various dimensions which incorporate a number of individual strands.

In general, the curly fiber produced in between about one and about one hundred denier, more preferably, about one and about fifty denier and, most preferably, about one and one-half to about twenty denier. Generally, the smaller the denier of the fiber the less the residual tensile force differential need be to produce a given number of turns per linear centimeter.

The fiber preferably has at least about two turns per linear centimeter and, more preferably, at least about six turns per linear centimeter and, most preferably, at least about ten turns per linear centimeter. Fibers with about fifteen or more turns per linear centimeter are possible using the instant process. By the term turns per linear centimeter is meant the number of revolutions per centimeter of helix length looking at the curly fiber as a helix.

Figure 2:
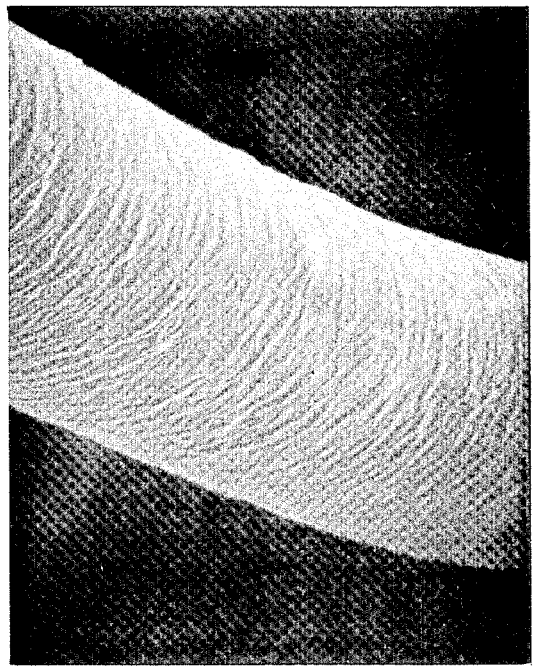
FIG. 2 shows a scanning electron microscope photomicrograph of a multisegment propylene-ethylene copolymer curly fiber produced by a process described herein showing the transverse rippling of the fiber surface. Magnification is 2000X.

Referring now to the Drawing, FIG. 1 shows a crystalline, multisegment ethylene-propylene copolymer fiber drawn by a process described herein and having about thirteen turns per linear centimeter. FIG. 2 shows the typical apparently axially symmetric, skin retraction on the surface of the fibers shown in FIG. 1 and produced by this invention. This "elephant skin" effect is believed to be caused by the residual tensile force differential present in the fiber.

Figure 3:
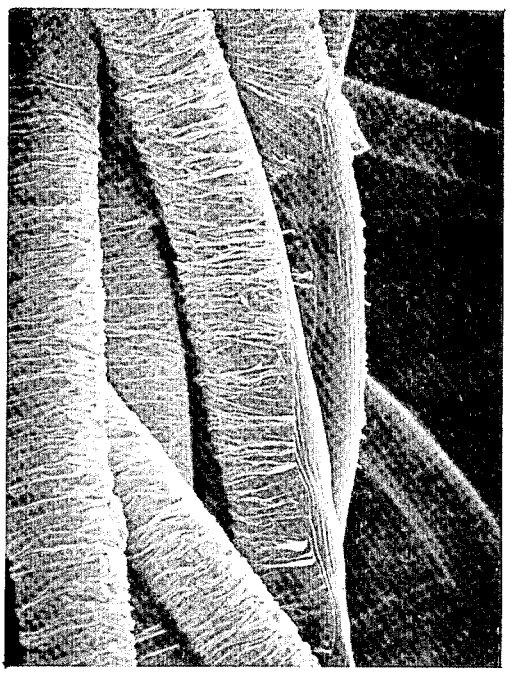
FIG. 3 is a scanning electron microscope photomicrograph of the fibers of FIG. 2 which have been thermally treated to partially separate the region of transverse rippling from the inner core of the fiber. Magnification is 400X.

FIG. 3 shows a portion of the fiber of FIG. 2 which was heat treated to separate the "elephant skin" from the remainder of the fiber. The thickness of the "elephant skin" in the photomicrograph is about 0.2 micron which is about one percent of the fiber diameter.

Figure 4:
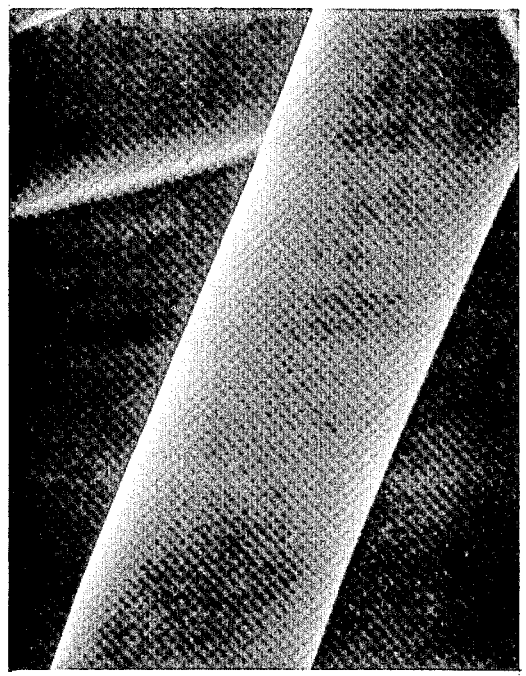
FIG. 4 shows a scanning electron photomicrograph of fiber made from a nucleated, multisegment propylene-ethylene copolymer which is not curly and does not exhibit the transverse rippling effect. Magnification is 2000X.

To test the hypothesis that narrowing the crystallization temperature range of the polymeric composition from which fibers are drawn can lead to insufficient residual tensile force differential to produce curl, a multisegment ethylene-propylene copolymer was nucleated with about two tenths percent by weight of succinic acid. The crystallization temperature range was reduced by about half and the fiber (FIG. 4) exhibits neither curl nor the "elephant skin" effect typical of curly polypropylene-dominated fibers made by a process described herein.

Finally, one embodiment of a process to make a web of the curly fibers of this invention is shown in FIG. 5. Polymer is pumped from extruder 1 to spinneret 3 by melt pump 2 where several fibers are withdrawn from the several extrusion apertures present in the face of spinneret 3. The drawing occurs in controlled cooling zone 4 which may be varied in length, as indicated by the break in the filaments and draft shield, depending upon, inter alia, the crystallization temperature range, rate of drawing, rate of cooling, type of polymeric composition, etc.

Zone 4 is enclosed by draft shield 5 to reduce convection current effects. The fibers are drawn by the tensile force developed by air gun 6 equipped with spreader 7 where the fibers 8 exit onto conveyor belt 9 equipped with suction 10. The web of curly fibers formed on conveyor belt 9 and held in place by suction 10 are then taken up on take-up roll 11. The dimensions of the web produced can be substantially varied by varying the number of strands produced, number of air guns, etc., as can be understood by one skilled in the art.

The curly synthetic fibers of this invention are useful for producing insulation, clothing and synthetic fabrics generally and can substitute for natural fibers in most of their applications.

While the invention is described in connection with the specific Examples below, it is understood that such Examples are for illustrative purposes only. Many alternatives, modifications and variations will be apparent to those skilled in the art in light of below Examples and such alternatives, modifications and variations fall within the scope and spirit of the intended claims.

GENERAL EXPERIMENTAL PROCEDURE

The apparatus used to form the curly fibers as described below was a Docan unit made by Lurgioel, Frankfurt, Germany. Briefly, the unit consists of an extruder followed by a melt pump and then a spinneret having a number of orifices. The exit face of the spinneret was oriented downward and the fiber strands leaving the face of the spinneret travel a substantial distance downwardly through an unheated cooling zone surrounded by a draft shield going into an air gun located at the bottom of the shield. The bottom portion of the air gun is equipped with a spreader such that the cooled fibers are removed from the gun with a width not exceeding the conveyor belt positioned immediately below the exit of the air gun. As the fibers come out of the air gun exit they are impelled onto the moving belt of the conveyor in the form of a web and are held in position there by virtue of a suction applied to the conveyor belt through suction holes incorporated into the belt. The fiber web is then removed from the end of the belt and taken up on a rotating storage spool.

Two different extruders were used each involving a different length of draft shield. The Plamvo extruder runs were made with a cooling chamber (draft shield) length of 31.8 feet, while runs using the Barmag extruder were made with a cooling chamber length of 23.4 feet. Three different types of propylene polymer were used; a homopolymer, terminal block copolymer, and a multisegment copolymer. The multi-segment copolymer was made in a process which involved polymerizing propylene using a titanium trichloride-aluminum alkyl compound-tetraethyl orthosilicate catalyst, adding small amounts of ethylene periodically to the reactor such that several additions were made during the reactor residence time. The terminal block copolymer was made by first polymerizing propylene using the above catalyst and then without deactivating, polymerizing a mixture of propylene and ethylene. The homopolymer was made using the catalyst system employed for the copolymers.

The cooling of the fiber in the controlled cooling zone was carried out substantially axially symmetrically using a draft shield.

Scanning electron microscope photomicrographs were taken on an International Scientific Instruments Co., Mountain View, Calif., instrument, model MSM-5. Melt flow rates were measured by ASTM D-1238.

EXAMPLES

The properties of some fibers made from a broad range of polypropylene based polymer compositions are shown in the Table below together with some properties of the starting polymer.

TABLE

| Polymer Type* | Polymer Melt Flow Rate (grams/ten min.) | Weight Percent Ethylene | $T_c$** °C. | Isothermal Crystallization*** | | | Turns per Linear Centimeter | |
|---|---|---|---|---|---|---|---|---|
| | | | | $T_c$ °C. | $t_{induct}$ (min.) | $t_{final}$ (min.) | Plamvo | Barmag |
| Homo | 2.6 | | 114 | | | | 2-4 | |
| MSC | 10.6 | 2.4 | 107 | | | | 6 | |
| MSC | 10.1 | | 115 | | | | 2-4 | |
| MSC | 8.6 | 1.4 | 112 | | | | ~5-6 | |
| TBC | 2.0 | | 113 | | | | >6 | |
| MSC | | 2.8 | 105 | 122 | 6.5 | 54 | 13 | |
| MSC | 8.7 | | | 127 | 4.1 | 72 | | 3-4 |
| MSC | 10.9 | | | | | | | |
| MSC | 7.9 | | | 127 | 6.8 | 59.4 | 11 | |
| MSC | 8.5 | | | 127 | 4.4 | 42 | | 2 |
| MSC | 9.9 | | | 127 | 6.4 | 49.9 | 6-9 | |
| Homo | 3.2 | | | | | | 6-7 | |
| Homo | 4.4 | | | | | | | 6 |
| MSC | 8.3 | 2.5 | | 127 | 12.5 | >62 | 10 | 3 |
| MSC**** | 10.2 | 2.4 | | 130 | <1.5 | 25-30 | 0 | 0 |

TABLE-continued

| Polymer Type* | Polymer Melt Flow Rate (grams/ten min.) | Weight Percent Ethylene | $T_c$** °C. | Isothermal Crystallization*** | | | Turns per Linear Centimeter | |
|---|---|---|---|---|---|---|---|---|
| | | | | $T_c$ °C. | $t_{induct}$ (min.) | $t_{final}$ (min.) | Plamvo | Barmag |
| Homo | 3.1 | | | 127 | 2 | 38 | | V. Slight |

*Homo is polypropylene homopolymer; MSC is multisegment ethylene-propylene copolymer; TBC is terminal block ethylene-propylene copolymer
**Crystallization temperature using differential thermal analysis at a cooling rate of 10° C. per minute
***Data obtained by differential scanning calorimeter.
****Nucleated with 0.2 weight percent of succinic acid prior to melt spinning.

What is claimed is:

1. A method of increasing the crystallization temperature range of a stereospecific polymer consisting essentially of extruding at a temperature between about 200° C. and about 325° C. a mixture of said stereosymmetric polymer and an organic compound, said organic compound having at least one bromine labile in the temperature range about 200° C. to about 325° C.

2. The method of claim 1 wherein said stereospecific polymer is substantially polypropylene having a crystallization temperature range less than about 20° C. at a cooling rate of about 10° C. per minute and said organic compound is

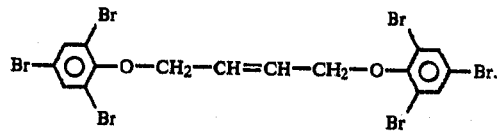

* * * * *